UNITED STATES PATENT OFFICE.

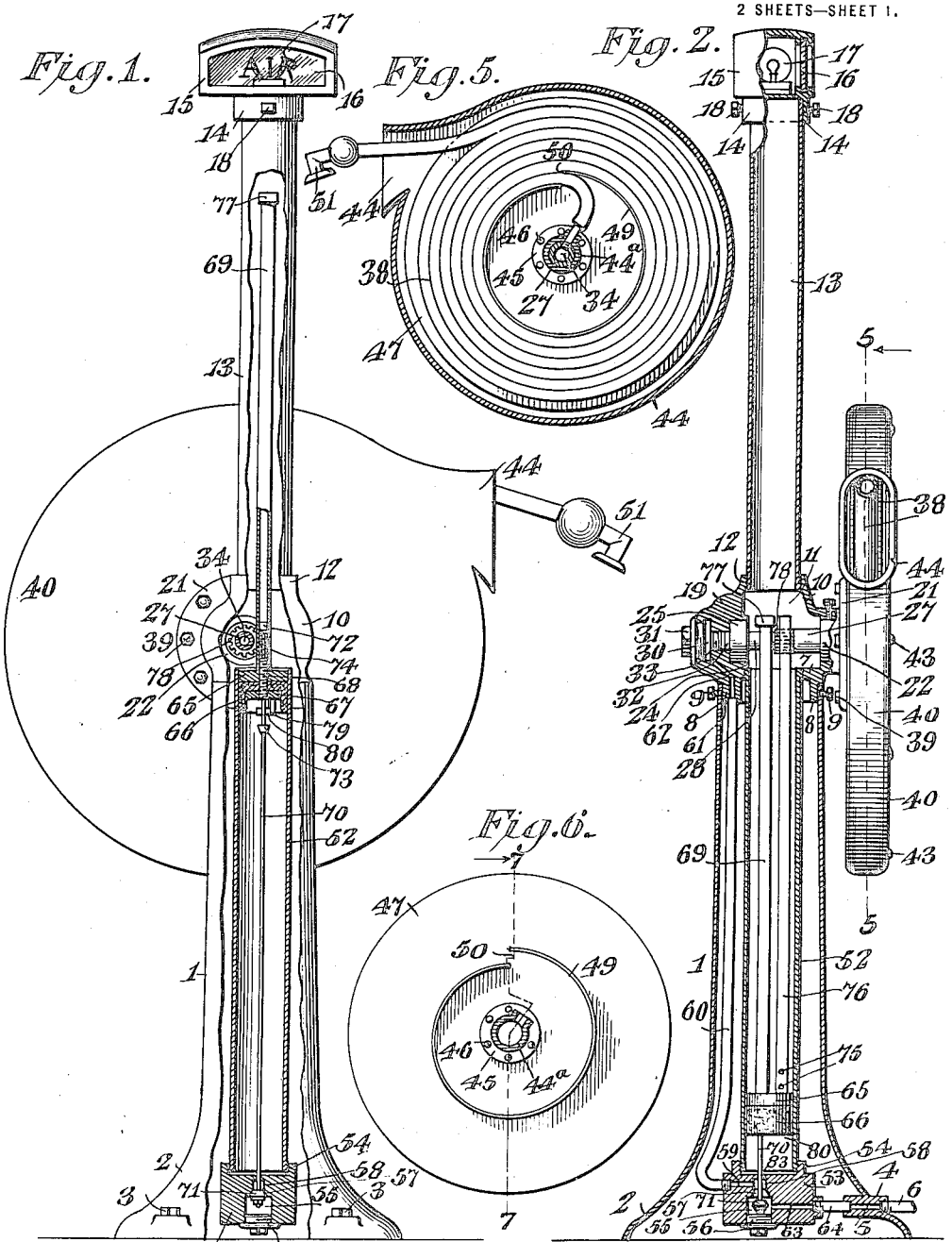
C. D. McCONNELL.
HOSE REEL.
APPLICATION FILED AUG. 19, 1914.
1,151,890. Patented Aug. 31, 1915.
2 SHEETS—SHEET 1.
Charles D. McConnell, INVENTOR C. D. McCONNELL.
HOSE REEL.
APPLICATION FILED AUG. 19, 1914.
1,151,890.
Patented Aug. 31, 1915.
2 SHEETS—SHEET 2.
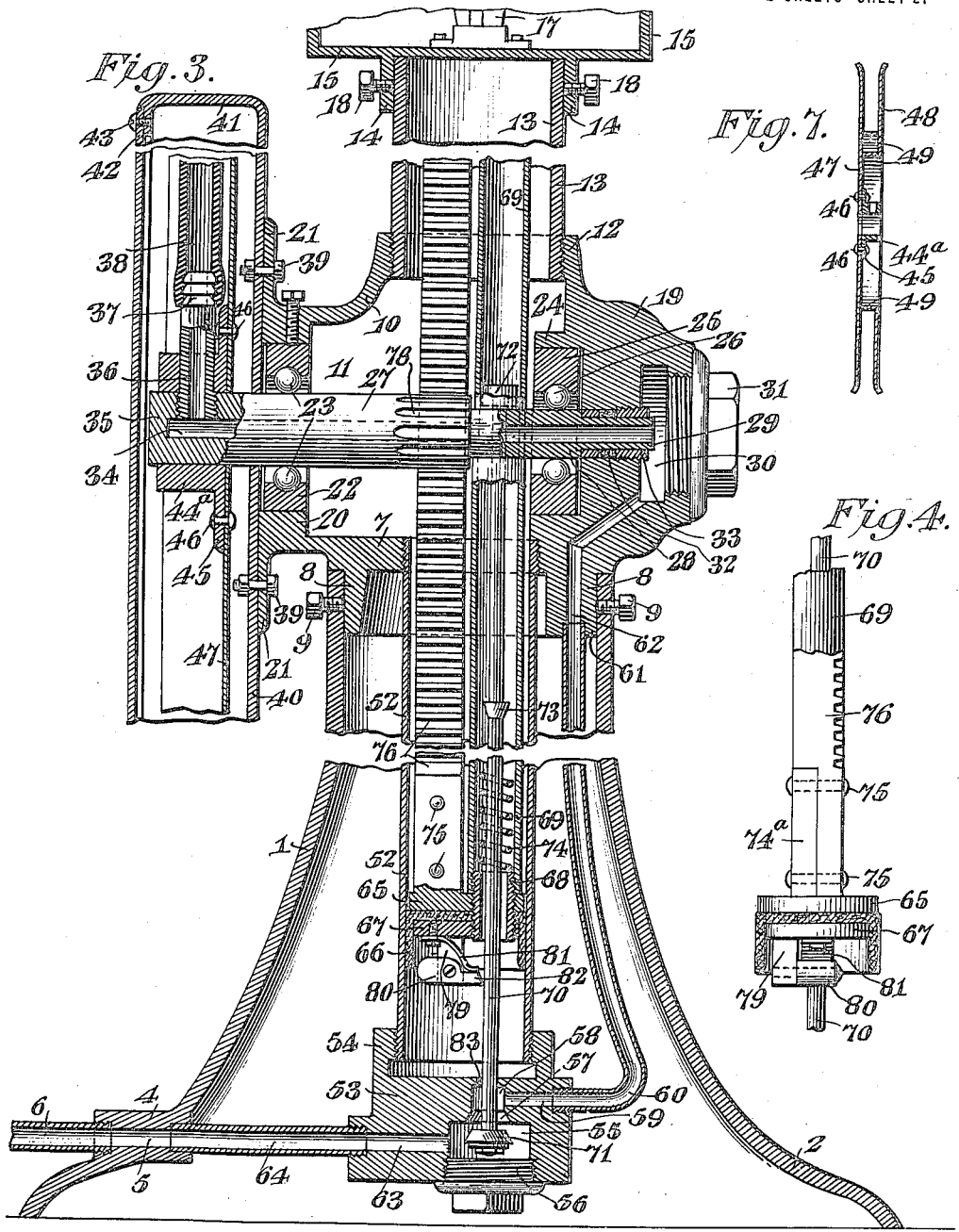
WITNESSES
Charles D. McConnell, INVENTOR
BY
ATTORNEY

CHARLES D. McCONNELL, OF OSKALOOSA, IOWA, ASSIGNOR OF ONE-HALF TO JOHN M. BRYSON, OF OSKALOOSA, IOWA.

HOSE-REEL.

1,151,890.

Specification of Letters Patent.     Patented Aug. 31, 1915.

Application filed August 19, 1914.   Serial No. 857,566.

*To all whom it may concern:*

Be it known that I, CHARLES D. McCONNELL, a citizen of the United States, residing at Oskaloosa, in the county of Mahaska and State of Iowa, have invented a new and useful Hose-Reel, of which the following is a specification.

This invention has reference to hose reels, and its object is to provide a hose reel which will automatically wind hose thereon, and which may be constantly attached to a supply of fluid to automatically deliver the fluid through the hose when the latter is drawn out from the reel.

The present invention is particularly useful in connection with garages, and may be used to supply air under pressure for charging pneumatic tires, or for cleaning purposes, or may be used for supplying water for washing automobiles and for other purposes. The hose reel is useful for supplying either air or water, and while for convenience of description it will be considered as arranged to supply air under pressure from a suitable source, it will be understood that such restriction in the description in no wise limits the use of the invention for the supply of air.

In accordance with the present invention there is provided a supporting member which may be either portable or may be arranged for rigid attachment to a solid foundation, and this supporting member carries a casing inclosing a hose reel, while mechanism is provided for winding the hose upon the reel, such mechanism being under the control of the particular fluid under pressure which the hose is designed to supply, and it may be considered as air under pressure. One end of the hose is constantly attached to the reel, and the other or nozzle end of the hose is accessible so that when desired the hose may be unwound from the reel. On unwinding the hose from the reel the mechanism provided causes the opening of a valve, by means of which the hose is freely coupled up to a source or supply of air under pressure, and the air will then flow out through the hose, and if the latter be connected to the valve of a pneumatic tire, the tire will be charged with air, or the air may be used for other purposes. The arrangement is such that the air under pressure tends constantly to rewind the hose upon the reel, and if the hose be unrestrained the winding continues until the hose is withdrawn into a casing inclosing the reel, and is, therefore, protected from damage which might occur if the hose were allowed to lay around upon the ground or upon the floor of the garage. Moreover, the arrangement is such that on the completion of the winding of the hose upon the reel, the hose is cut off from the supply of air, thus avoiding waste. The rewinding tendency is always present during the time that the hose is withdrawn from the protecting casing, so that it is necessary to constantly exert a force sufficient to hold the hose in the unwound position, wherefore on the release of the hose it will be automatically drawn into the protecting casing by being wound upon the reel.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings, Figure 1 is an elevation with some parts broken away and in section, of a hose reel construction embodying the present invention. Fig. 2 is a longitudinal central vertical section of the structure of Fig. 1 with some parts in elevation and taken at right angles to the showing of Fig. 1. Fig. 3 is a section similar to Fig. 2 but viewed from the opposite side of the structure, the showing of Fig. 3 being on a larger scale than Fig. 2, and with parts broken away to admit of the larger showing. Fig. 4 is a fragmentary view, partly in section, of the piston end of a pneumatic actuator for the hose reel. Fig. 5 is a section of the hose reel and casing on the line 5—5 of Fig.

2. Fig. 6 is a section of the hose reel in a plane similar to that of Fig. 5, but omitting the hose and casing. Fig. 7 is a section on the line 7—7 of Fig. 6.

Referring to the drawings, there is shown a hollow column 1 constituting the main supporting member of the structure, this column being upright and expanding at the lower end into a foot portion 2, through which suitable bolts 3 may pass for fastening the column to a foundation or support. The column is hollow to inclose certain mechanism to be described, and in the foot portion or base 2 there is provided a boss 4 having a longitudinal passage 5 therethrough extending from the exterior to the interior of the base, the outer end of the boss being arranged for the connection of a pipe 6 which may be considered as leading from a suitable reservoir or source of air under pressure, or when the device is used with water as the fluid, the pipe 6 will connect with a water reservoir. Since air and water differ somewhat in characteristics, the dimensions of the structure may be changed as needed to adapt it to one or the other fluid. The arrangement shown in the drawings corresponds more nearly to the structure employed for utilizing air.

On top of the column 1 there is a cap member 7 provided with a flange 8 adapted to enter the top of the column to center the cap, while the latter rests on the upper end of the column. This cap member may be held in place by set screws 9 bearing against the flange 8, as shown in the drawings, but, of course, it will be understood that these are structural features susceptible of various changes.

The cap member supports a casing 10 inclosing a chamber 11 designed to receive certain mechanisms to be described. At the upper end the casing 10 is provided with an upstanding neck 12 into which is screwed the lower end of an upright tubular member 13, and the latter at its upper end enters another neck 14 on a case 15 having windows 16 upon which may be painted or otherwise displayed information as to the character of the material supplied by the device. In the particular arrangement shown the windows 16 have the word "Air" displayed thereon, and in order that the word may be readily visible, a light-giving device 17 is inclosed within the casing 15, such light-giving device being customarily a small electric bulb. The neck 14 is conveniently held to the upper end of the tube 13 by set screws 18, but, of course, other means for the purpose may be provided.

At one side of the casing 10 is an enlargement or boss 19, and at the opposite side is a neck 20 having an exterior flange 21 thereon. Mounted in the neck 20 is a ring 22 carrying anti-friction balls 23. The boss 19 has formed on its inner face a circular flange 24 in which is mounted a ring 25 carrying anti-friction balls 26. The anti-friction bearings, of which the rings and the balls carried thereby may be taken as typical, are arranged in alinement and carry a shaft 27, which for a portion of its length is of reduced diameter, as shown at 28, and this reduced portion is still further externally reduced, as shown at 29. The portion of larger diameter of the shaft 27 is extended through the ball bearings 23, while the portion of next smaller external diameter is mounted in the ball bearings 26, the bearings being on opposite sides of the longitudinal center line of the column or post 1.

The boss 19 is bored out for the passage of the portion 29 of the shaft 27, and is also counterbored as shown at 30, and is there suitably tapped for the reception of a closing plug 31 in line with the shaft 27. The small end of the shaft 27 stops short of the outer end of the boss 19 and terminates within the counterbore 30. Where the reduced portion 29 of the shaft 27 extends beyond the bearing 26 part way through the boss 19, it is surrounded by packing 32 held in place by a ring-nut 33 threaded into the corresponding portion of the boss where bored out to permit the passage of the end 29 of the shaft 27. This forms a fluid-tight connection between the small end of the shaft 27 and the boss 19, without, however, preventing the turning of the shaft when needed.

Extending from the outer extremity of the end 29 of the shaft 27 to a point close to the other end of the shaft is an axial passage 34 through the shaft, but this passage is closed at the larger end of the shaft by a wall 35 or otherwise. Near the wall 35 the shaft is radially tapped for the reception of one end of a pipe 36, the other end of which is formed into a hose-receiving nipple 37 of customary shape, and to this nipple 37 is attached one end of a hose 38, the latter being such as is usually employed for carrying air under pressure where air is the fluid used, or water under pressure where water is the fluid used.

Fast to the flange 21 by bolts 39 or otherwise is a cylindrical casing 40 provided with an axially extended marginal rim 41, and with a face plate 42 in spaced relation to the main portion of the casing 40, the face plate 42 being held to the casing by screws 43 or otherwise. At one point the rim 41 is formed into a substantially tangential mouth extension 44 designed for the passage of the hose 38.

The shaft 27 at the end carrying the nipple 37 is located within the casing 40, and there has fast to it a collar 44ª, having at one end a radial flange 45. Fast to the flange 45 by rivets 46 or otherwise is an annular plate 47 carrying in spaced relation thereto a matching plate 48 connected to the plate 47 by a spiral wall or strip 49 having adjacent ends spaced apart radially of the plate 47 to provide a mouth or opening 50. The plates 47 and 48 constitute a hose reel which is wholly contained within the casing 40. The hose 38 with one end attached to the nipple 37 is carried through the opening 50 in the spiral supporting strip 49 and then wound spirally upon the strip and upon itself within the casing and the other or outer end of the hose is provided with a suitable nozzle 51. The arrangement is such that this nozzle 51 is exterior to the casing when the hose is completely wound upon the hose reel so as to be readily accessible. The nozzle 51 in the particular showing of the drawings is of a character permitting its ready application to the inner tube valve nipple of a pneumatic tire, but any other style of terminal structure may be provided for the hose. For instance, where a stream of air for cleaning purposes is desired, the hose would, of course, be provided with an ordinary straight nozzle, or some special form of nozzle for the purpose, and the same would be true in case of the use of water instead of air.

Within the post or pillar 1 and depending from the cap 7 is a pipe 52 which may be conveniently threaded through the cap 7 for attachment thereto. The pipe 52 is arranged about concentric with the longitudinal center line of the post or standard 1, and the lower end of the pipe carries and is normally closed by a block 53, one end of which is formed with a neck 54 into which the corresponding end of the pipe 52 is threaded. Within the block 53 there is formed a chamber 55 closed at one end by a plug 56, and at the other end provided with a valve seat 57 communicating with a passage 58 from one side of which there leads another passage 59 in constant communication with one end of a pipe 60, which end is made fast in the block 53. The pipe 60 is continued within the post 1 to a boss 61 on the flange 8 and there the corresponding end of the pipe 60 is made fast to the boss 61 in communication with a passage 62 through the boss 61 and the boss 19 and opening into the chamber or counterbore 30, which in turn is in communication with the bore 34 of the shaft 27.

Leading into the chamber 55 of the block 53 is a passage 63 entered at its outer end by one end of a pipe 64, and the other end of this pipe is secured in the boss 4 in communication with the passage 5 therethrough.

The pipe or tube 52 is designed to serve as a cylinder or barrel, and in it is lodged a piston 65, so as to be capable of reciprocatory movements therein. The piston is provided with a cup leather 66 of customary form suitably held in place by a plate 67. Threaded through the piston 65 and plate 67 is a screw nipple 68 receiving at the end remote from the plate 67 one end of a tube 69, this tube emerging from the upper end of the pipe or cylinder 52 and entering the lower end of the pipe or tube 13 in spaced relation to the inner walls of said pipe.

Extending through the nipple 68 is a valve rod 70 also entering the passage 58 in the block 53 through a suitable opening, and within the chamber 55 carrying a valve 71 adapted to the valve seat 57. The valve rod 70 is of an appropriate length to extend for a suitable distance through the pipe 69 and at its upper end is provided with a head 72 fitting the interior of the pipe 69 snugly, but capable of movement therealong. At an appropriate point spaced from, but rather close to the head 72 the rod 70 is provided with a tapering collar 73 of a diameter to permit its passage through the nipple 68. Carried by the nipple 68 within the pipe 69 is a short buffer spring 74 which under conditions to be described is engaged by the head 72.

The piston 65 is formed with an upstanding member 74ª to which is secured by rivets 75 or otherwise, one end of a rack bar 76 which may be of a length approximating that of the tube 69, and this tube 69 has its upper end closed by a cap 77 so as to make the tube there practically air tight. The rack bar 76 is movable lengthwise through the pipe or cylinder 52 and into the pipe or tube 13, and is in mesh with a pinion 78 shown as formed on the shaft 27, but it will be understood that such pinion may be separately made and attached to the shaft if so desired.

Depending from the plate 67 is a bracket 79 to which is pivoted a pawl 80 yieldably held in a desired position by a spring 81. The active end or nose 82 of the pawl is in the path of the conical collar 73 and is shaped to ride in one direction past the collar, and in the other direction to engage it, but is even then capable of snapping by the collar because of the yielding of the spring 81.

Where the valve rod 70 passes through the block 53 to enter the chamber 58, a small by-pass hole 83 is provided.

Let it be assumed that the hose is withdrawn from its casing, and under such conditions the piston 65 is at its lowermost position. Let it further be assumed that the valve 55 is in the open position and that air pressure is established in the pipe 6. The air under pressure now flows through the pipe 64 and passage 63 into the chamber 55 and from thence finds its way through the passage 59 into the pipe 60, and from thence by the passage 62 into the chamber 30, continuing its way through the bore 34 and nipple pipe 36 into the hose 38, finally escaping through the nozzle 51, which latter if attached to the valve nipple of the inner tube of a pneumatic tire will charge the latter with air under pressure. The compressed air flowing to the pipe 60 finds its way through the by-pass 83 into the cylinder 52, and slowly established pressure is exerted against the piston tending to raise it, such tendency being imparted to the rack 76 so that there is also a tendency to rotate the shaft 27 in a direction to wind the hose upon the hose reel. This tendency is, however, resisted by a suitably applied force holding the hose against such movement into the casing inclosing the hose reel. Suppose, now, that the hose is released, the resistance then offered is insufficient to arrest movement of the piston 65, so that the latter rises under the accumulating pressure still slowly exerted because of the small size of the opening 83. The result is that the shaft 27 is turned in a direction to wind the hose upon the hose reel, and this movement continues with relative slowness until the hose is completely wound upon the reel except for a small length which extends through the mouth 44, wherefore the nozzle 51 remains outside of the casing ready for grasping. The rising movement of the piston carries the pipe or tube 69 with it, but this has no immediate effect upon the valve, for the pipe 69 can slip over the head 72 easily. When the pawl 80 reaches the collar 73 the conical form of the collar provides no holding point for the pawl, and the pawl readily rides along the collar, said pawl being of the gravity type, as well as the spring type, and the movement just described is opposed only by a small overweight of the pawl as it moves away from the spring. The position of the parts, therefore, when the piston is at its highest points has the pawl 80 above the collar 73. Before the piston has reached the highest point, the buffer spring 74 comes into engagement with the head 72 and causes the lifting of the valve 55 into engagement with the seat 59, the buffer spring 74 finally compressing to some extent to hold the valve 71 tightly to its seat. The result is that when the hose is wound up to the full desired extent, the air supply is cut off from communication either with the interior of the cylinder or barrel 52 or the pipe 60, but the frictional engagement of the piston and its packing with the cylinder or barrel 52 is sufficient to hold the piston in the elevated position. If, now, it be desired to use the hose, the operator by grasping the nozzle 51 exerts force upon the hose to withdraw it from the casing, thus rotating the shaft 27 in opposition to the direction of rotation just described, and this causes a lowering of the piston, the air ahead of the piston escaping through the opening 83. Before the hose has been withdrawn from the casing to the extent permitted by the length of the hose, the pawl 80 is brought into engagement with the collar 73, thus moving the valve 71 to the open position, and permitting air to reach the hose ready for any use to which it may be put, and the same is true in the case of water being the fluid under pressure employed.

With the present invention connection of the hose with the source of fluid under pressure is automatically established on withdrawing the hose from the protecting casing and force must be constantly applied to hold the hose in the withdrawn position. As soon as the hose is released it is automatically returned to the wound up condition within the protecting casing, so that without attention on the part of the operator the hose when not in use is always returned to the protected position where it is free from damage which might occur to a hose allowed to lie upon the floor or ground, and where dependence is had upon an attendant for the proper disposition of the hose to protect it.

What is claimed is:—

1. A hose reel structure comprising a hose reel with a hose connection, a one-way actuating means for the reel responsive to fluid under pressure, and means responsive to a movement of the reel in the opposite direction to control the flow of fluid under pressure to both the reel actuating means and to the hose connection of the reel.

2. A hose reel structure comprising a hose reel having a hose connection thereon, a hose attached to the connection, means for directing fluid under pressure to the hose attached to the reel, a one-way actuating means for the reel responsive to fluid under pressure and having a constant tendency when active to move the reel to wind the hose thereon, and means responsive to a movement of the reel due to withdrawing the hose therefrom for controlling the flow of fluid under pressure to the reel actuating means.

3. A hose reel structure comprising a rotatable hose reel, a protecting casing inclosing the reel, a reciprocable actuating means for the hose reel, and fluid pressure connections and controlling means therefor for supplying hose carried by the hose reel with fluid under pressure and causing the reciprocable member to move in a direction to turn the hose reel to wind hose thereon.

4. A hose reel structure comprising a hose reel, a rotatable shaft carrying the reel and provided with a pinion, a piston and cylinder therefor, a rack fast to the piston and engaging the pinion on the shaft, air connections for the hose reel, a valve controlling the air connections, and valve operating means carried by the piston.

5. A hose reel structure comprising an elongated upright supporting member, bearings intermediate of the length thereof, a hollow shaft mounted in the bearings and extending transversely of the length of the supporting member, a hose reel carried by the hollow shaft at one end of the latter and provided with a hose-receiving nipple communicating with the interior of the shaft, a casing carried by the support and inclosing the hose reel and provided with an outlet for hose when wound upon the reel, a reciprocable piston and cylinder therefor, the latter being mounted within the support, a rack carried by the piston for rotating the shaft, and said shaft having a pinion thereon in mesh with the rack, a tubular member carried by the piston, a valve rod within the tubular member having a portion extending through the piston and there carrying a valve, a valve block carried by the cylinder for the piston and provided with a valve seat for the valve, and means for connecting a source of fluid under pressure with the valve block and for connecting the hollow shaft with the valve block.

6. A hose reel structure comprising an elongated upright supporting member, bearings intermediate of the length thereof, a hollow shaft mounted in the bearings and extending transversely of the length of the supporting member, a hose reel carried by the hollow shaft at one end of the latter and provided with a hose-receiving nipple communicating with the interior of the shaft, a casing carried by the support and inclosing the hose reel and provided with an outlet for hose when wound upon the reel, a reciprocable piston and cylinder therefor, the latter being mounted within the support, a rack carried by the piston for rotating the shaft, and said shaft having a pinion thereon in mesh with the rack, a tubular member carried by the piston, a valve rod within the tubular member having a portion extending through the piston and there carrying a valve, a valve block carried by the cylinder for the piston and provided with a valve seat for the valve, and means for connecting a source of fluid under pressure with the valve block and for connecting the hollow shaft with the valve block, the piston carrying elastic means for closing the valve and yieldable means for opening the valve, and the valve rod being provided with means coacting with the yieldable means for the opening of the valve.

7. A hose structure provided with a reel for carrying the hose, means responsive to fluid under pressure and having a constant tendency under the fluid pressure to move the reel in a direction to wind hose thereon, and means for controlling the flow of fluid under pressure to the reel actuating means and in turn controlled by the movement of the reel in the reverse direction to the movement of the reel caused by said reel actuating means.

8. A hose structure comprising a rotatable hose reel having means thereon for the attachment of a hose thereto, means for connecting the hose attachment to a source of fluid under pressure, means for rotating the reel under the action of the fluid under pressure in a direction to wind hose on the reel, and means for directing fluid under pressure to the reel actuating means and to the hose and controlled by the movement of the reel caused by withdrawing the hose therefrom.

9. A hose reel structure comprising a rotatable hose reel with a hose connection thereon, a hose attached at one end to the connection and normally wound on the reel and accessible for withdrawal from the reel to thereby rotate the reel in one direction, means for directing fluid under pressure to the hose connection of the reel for flow through the hose from the reel toward the other end of the hose, means responsive to fluid pressure and movable in one direction to rotate the reel in a direction to wind hose thereon, and means controllable by the movement of the reel on the withdrawal of the hose therefrom for directing fluid under pressure to the hose actuating means responsive to fluid pressure.

10. A hose reel structure comprising a rotatable reel with a hose connection thereon, means for coupling the hose when on the reel to a source of fluid under pressure and reciprocable means responsive to the fluid under pressure received from the source to move in one direction to rotate the reel to wind hose thereon and movable in the other direction by the reverse rotation of the reel caused by withdrawing the hose therefrom, and in opposition to the force exerted by the fluid under pressure on said reciprocable means.

11. A hose reel structure comprising a rotatable reel with means for the connection of a hose thereto, means for coupling the hose when on the reel to a source of fluid under pressure, and reciprocable means responsive to fluid under pressure received from the source to move the reel in a direction to wind hose thereon and movable in the other direction by the unwinding of the hose from the reel, the structure being also provided with a valve movable to the open position on the unwinding of the hose from the reel and movable to the closed position by the winding of the hose on the reel.

12. A hose reel structure comprising a rotatable reel having means for connecting a hose thereon to a source of fluid under pressure, means responsive to the fluid under pressure for actuating the reel in a direction to wind the hose thereon, and means for directing fluid under pressure to the hose and provided with a branch connection to the reel actuating means, whereby the hose winding tendency of the reel actuating means is maintained so long as fluid under pressure is directed through the hose.

In testimony that I claim the foregoing as my own, I have hereto affixed my signature in the presence of two witnesses.

CHARLES D. McCONNELL.

Witnesses:
 JNO. CLEVELAND,
 FRANK T. NASH.